May 26, 1931.  C. M. L. BUNDY  1,806,964
APPARATUS FOR TEACHING MUSIC
Filed Dec. 18, 1929
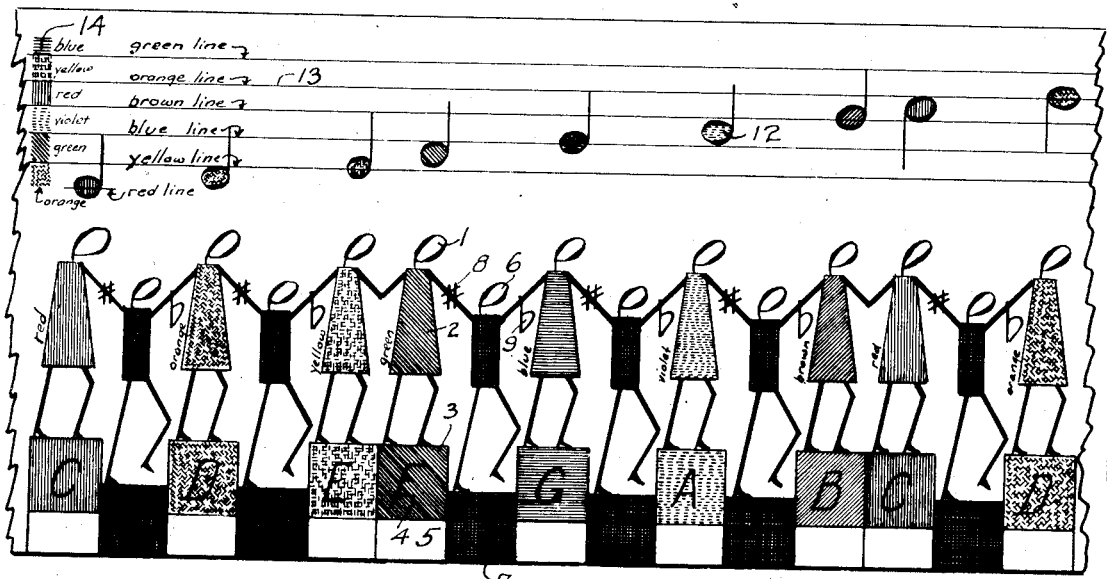
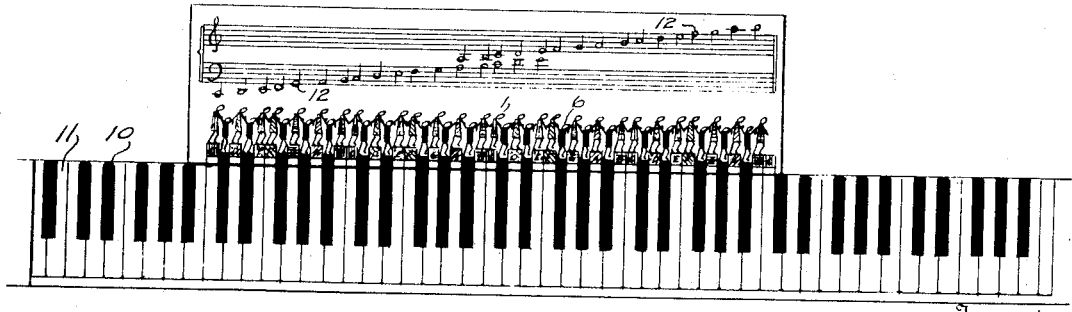
Clara Mighell Lewis Bundy Patented May 26, 1931

1,806,964

UNITED STATES PATENT OFFICE

CLARA MIGHELL LEWIS BUNDY, OF TACOMA, WASHINGTON

APPARATUS FOR TEACHING MUSIC

Application filed December 18, 1929. Serial No. 414,961.

My invention relates to means for teaching individuals, especially very young children, the art of reading music, that is to say the art of translating the written music to the corresponding keys of the keyboard, as of a piano.

The objects of my invention are to facilitate the association of a certain printed note with its corresponding key of the keyboard, and thereby to cause the pupils to comprehend the correspondence of said notes with said keys and to hasten their acquiring such proficiency that they can be advanced to more difficult work at a much earlier date than with the usual methods and apparatus.

I attain these and other objects by means of the apparatus illustrated in the accompanying drawings, in which:—

Fig. 1 is an illustration of my invention as applied to sheet music, wherein said sheet is printed in colors; Fig. 2 is an illustration of a portion of one of the charts used in my invention, whereby the pupil is taught to associate certain notes in the printed music with certain colors and to associate the corresponding keys of the keyboard with the same colors; and Fig. 3 is a view showing one of the charts as applied to the keyboard of a piano, the chart however being shown as lying flat instead of vertically as normally used.

Similar numerals of reference refer to similar parts, and similar symbols of colors refer to corresponding notes in the music and on the keyboard throughout the several views.

Written music comprises a staff of five treble and five base lines, with a space therebetween from which the eleventh line has been deleted, together with a mark, called a note, placed in relation to said lines and representing, by its position, a certain tone in the scale. Every twelfth tone is of a similar character, having a vibratory relationship to the first note of two-to-one, and the intermediate tones form the scale of the octave. There are eleven intermediate tones whose rates of vibration increase geometrically. If the note known as "C" be taken as the starting point, then the second, fourth, fifth, seventh, ninth, and eleventh tones above said note form what is known as the natural scale and are named, respectively, "D", "E", "F", "G", "A", and "B", while the first, third, sixth, eighth, and tenth tones are each given two names derived from the above named natural scale notes between which they are positioned, namely, "C sharp or D flat", "D sharp or E flat", "F sharp or G flat", "G sharp or A flat", and "A sharp or B flat".

In the printed music each of the above natural scale or named notes is printed in black and occupies one of two positions relatively to the lines of the staff, namely it is either between two lines or is bisected by one of the lines; and each such note occupies one position only in the staff in that octave, though in other octaves it occupies entirely different positions in the staff.

In the piano, and other, keyboards all these natural scale notes are formed with white keys and all these with derived names are of black material.

In teaching the very young, and those of low musical mentality, the first step is for the pupil to gain the concept that the notes of the printed music refer to the white keys of the piano; then, that each printed note refers to or corresponds with a definite key of the piano. These ideas, especially, the last, require, in many children, a great amount of patient study before they have acquired sufficient practice in coordinating the action of their hands with their vision to unfailingly and promptly pick out and strike the correct key corresponding with the printed note, and it is the purpose of this invention to provide means whereby the difficulties of the pupil in acquiring the needed proficiency may be greatly reduced.

It has been, to some extent, the practice to teach the young by means of a chart, comprising a full scale picture of the keys of a piano, together with the music staff having the corresponding note printed thereon immediately above each key therein represented, and to place said chart in front of the player, and in corresponding position in relation to the keys of the piano. This system was a great improvement over the former method wherein no such chart was used.

In my invention, I not only conform to the standard rules and practice in relation to the placing of the printed notes in the staff, and provide a chart which corresponds with the keyboard of the piano, but I add thereto the feature of providing each note of the natural scale with a separate and distinct color, and corresponding notes in different octaves with the same color. These colored notes may be used in conjunction with the ordinary chart, above described, having, however, the representation of the white piano keys colored with corresponding colors, or may be used in a special chart, such as is shown in Figs. 2 and 3, in which the natural scale notes are represented by a series of girls 1, having dresses 2 of the corresponding colors, and standing on blocks 3 of corresponding colors and named with the corresponding standard alphabetical letters 4. The blocks 3, on which the girls 1 stand, are placed above a white space 5 representing the front end of the corresponding white key of the piano keyboard. In proper places the notes having derived names are represented by boys 6, in black clothes, and standing on black blocks 7, which are lower than the colored blocks 3 and higher than the white spaces 5. The heads of both the boys 6 and the girls 1 may be formed similar to notes, as shown, and since the heads are therefore all inclined towards the right, the legs and feet are all shown as if in motion towards the right or up the scale. The entire set are shown with their hands joined, showing that each note forms a part of the entire group. But each boy 6, having two derived names, is represented as having a sharp symbol 8 in his left hand, which joins the right hand of the girl 1 to his left, and the flat symbol 9 in his right hand, which joins the left hand of the girl 1 to his right, and thus showing that he takes the name of his left-hand neighbor if the sharp symbol is present in the printed music, or that of his right-hand neighbor if the flat symbol is present. The spacing of the blocks 3 and 7 corresponds exactly with that of the standard keyboard of the piano, so that when said sheet is properly placed adjacent the keys of the piano, each black block 7 is adjacent a black key 10 of the piano, and each colored block 3 is directly over a white key 11 of the piano.

A staff is also represented on the chart, consisting of the standard ten lines, and immediately above each key or girl 1, of the lower portion of the chart, is printed the corresponding note 12. This note 12 is also colored to correspond with that of the colored key 1. In addition, the lines 13 of the staff may be made with colored inks to correspond with the notes which they bisect, and the spaces 14 may be colored, preferably for a short distance only, to correspond with the notes which lie between the several lines.

This idea may be carried out also in the sheet music used by the pupil, such as is shown at 15 in Fig. 1, wherein the notes are given the same colors as in the above-described chart. In this case too the child may be aided by singing certain words as it plays the piece. Where the music calls for sharps and flats involving white keys, I use the proper symbol printed in the color of the key to be played, so if "E sharp" is written, the sharp symbol 8 will be printed in green, thus indicating that the "F" natural tone or key is to be played; similarly the "F flat" would be printed in yellow, the "B sharp" in red, and the "C flat" in brown.

I have adopted the following colors for the several notes of the natural scale, in the practical working out of my invention:—"C" is represented by red; "D" is represented by orange; "E" is represented by yellow; "F" is represented by green; "G" is represented by blue; "A" is represented by violet; and "B" is represented by brown. Thus it will be seen that, in the "C" or natural scale, the colors are arranged in the order of the spectrum from the red to the violet, and that brown is interposed between the violet of the one octave and the red of the next. Since brown takes on something of the character of the red, and is similar to the violet in that it is dark, it therefore forms a gradation from the high end of one spectrum to the low end of the other, just as the note "B" of the one octave leads to the note "C" of the next. Of course, it is understood that, though I have selected these particular colors, I do not wish to confine myself to them, specifically, but simply name them herein as illustrative of the principle of my invention.

In certain cases I may vary the chart to indicate the separate octaves by making the blocks 3 higher in successive octaves to the right, or by using a lighter shade of the same color in successive octaves to the right. Also, in other cases, I may make the blocks successively higher, note by note, from left to right thus indicating the gradual rising tone of the successive notes.

The chart is used by placing it in front of the pupil, adjacent the rear end of the piano keys, in such position that all the black blocks 7 aline with the black keys 10 of the piano, and the white spaces 5 aline with all the white keys 11 of the piano. In the form of the chart illustrated in Fig. 3, also, the middle "C" of the keyboard must aline with the middle "C" of the chart. Other charts, however, may be prepared for teaching the notes both to the right and to the left of the chart as illustrated, or a single chart may be made for the whole keyboard, if desired.

In applying my invention I am depending on several well known laws, for instance, that colors attract the normal eye and interest; that differences of color are readily and instantaneously perceived; that similar colors are at once recognized; and that the child quickly learns to associate a color with a note. The child, then, only has to learn, at first, by its general position, in which octave the particular note is located. In consequence, therefore, it is found that providing a separate color for each note of the natural scale is of great assistance to the pupil in learning the name and position of the printed note and the name and position of the corresponding piano key. It is also found that the use of these colors stimulates the interest of the child and adds the feature of a game to what was formerly purely a lesson. Also, it is found, that the representation of the black keys by an entirely different figure from the colored notes, and by inserting the sharp and flat symbols between the colored and black notes aids the child in comprehending the relationship of the black to the colored notes.

It is, of course, understood that many variations may be made in the carrying out of my invention, without departing from the spirit thereof as outlined in the appended claims, for instance, the chart may have other figures or pictures instead of the children therein represented; or the children may not be in the same attitudes; or the staff lines alone may be colored to correspond with the children, the notes being printed in black; or the spaces alone may have colored blocks (4) at the left-hand end, or elsewhere, and the notes be printed in black; or other similar changes may be made, but I have described what I conceive to be the best form of my invention.

Having, therefore, described my invention, what I claim and desire to secure by Letters Patent, is:—

1. A chart for teaching music comprising a representation of each key of an octave by a picture, the pictures representing the keys of the natural scale having a space therein colored a distinct and different color, and the pictures representing the black keys having a corresponding black space therein.

2. A chart for teaching music comprising a representation of each key of an octave by a picture representing a clothed human figure, the clothes of the figures representing the keys of the natural scale being colored distinct and different colors, and the clothes of the figures representing the black keys being black.

3. A chart for teaching music comprising a representation of each key of an octave by a picture representing a human figure standing on a block, the blocks of the figures representing keys of the natural scale being colored distinct and different colors, and the blocks of the figures representing the black keys being black.

4. A chart for teaching music comprising a representation of each key of an octave by a picture representing a human figure, the figures representing the keys of the natural scale being girls dressed in clothes of distinct and different colors, and the figures representing the black keys being boys dressed in black.

5. A chart for teaching music comprising a representation of each key of an octave by a picture representing a clothed human figure, the clothes of the figures representing the keys of the natural scale being colored distinct and different colors, the clothes of the figures representing the black keys being black; said colored figures being represented as joining hands with said black figures, and as jointly carrying the symbol of the black key between them.

6. A chart for teaching music, comprising a representation of each key of an octave, the representation of the keys of the natural scale being colored distinct and separate colors, and the representation of the intermediate black keys being black.

CLARA MIGHELL LEWIS BUNDY.